US012150460B2

(12) United States Patent
Bergmann et al.

(10) Patent No.: US 12,150,460 B2
(45) Date of Patent: Nov. 26, 2024

(54) METHOD AND APPARATUS FOR PROCESSING LEGUMES

(71) Applicant: ENDECO GMBH, Buchholz-Mendt (DE)

(72) Inventors: Karl-Heinz Bergmann, Hennef (DE); Reiner Buntrock, Emlichheim (DE)

(73) Assignee: ENDECO GMBH, Buchholz-Mendt (DE)

( * ) Notice: Subject to any disclaimer, the term of this patent is extended or adjusted under 35 U.S.C. 154(b) by 868 days.

(21) Appl. No.: 16/969,852

(22) PCT Filed: Feb. 13, 2019

(86) PCT No.: PCT/EP2019/053553
§ 371 (c)(1),
(2) Date: Aug. 13, 2020

(87) PCT Pub. No.: WO2019/158589
PCT Pub. Date: Aug. 22, 2019

(65) Prior Publication Data
US 2020/0375217 A1   Dec. 3, 2020

(30) Foreign Application Priority Data
Feb. 14, 2018   (DE) .......................... 102018202275.5

(51) Int. Cl.
*B02C 9/00*   (2006.01)
*A23J 1/14*   (2006.01)
(52) U.S. Cl.
CPC .. *A23J 1/14* (2013.01); *B02C 9/00* (2013.01)
(58) Field of Classification Search
CPC .... B02C 9/00; B02C 7/02; B02C 7/06; B02C 7/18; B02C 7/182; B02C 7/186; B02C 23/38; A01J 1/14; D21D 1/303
(Continued)

(56) References Cited

U.S. PATENT DOCUMENTS

| 293,047 A | * | 2/1884 | Mackey | B02C 21/02 241/257.1 |
| 814,114 A | * | 3/1906 | Burr | B02C 7/06 241/261.1 |

(Continued)

FOREIGN PATENT DOCUMENTS

| AT | 326470 B | | 12/1975 |
| CN | 105727811 | * | 7/2016 |

(Continued)

OTHER PUBLICATIONS

Anonymous, "Supatron—High sehar in-line Homogeniser", Apr. 3, 2013, 8 pages <www.pump-kin.com.cn/uploadfile/file/20130403114922.pdf>.

(Continued)

*Primary Examiner* — Faye Francis
(74) *Attorney, Agent, or Firm* — International IP Law Group, PLLC

(57) ABSTRACT

A method for breaking down legumes includes mixing legumes with an aqueous extraction agent to form a legume mixture. The legume mixture is pre-comminuted using a first rotor-stator homogenizer with adding an aqueous extraction agent through stator openings directly into a shearing and mixing zone. The pre-comminuted legume mixture is incubated by further adding the aqueous extraction agent in a swelling tank arranged between the first rotor-stator homogenizer and a second rotor-stator homogenizer. The incubated legume mixture is fine grinded with the second rotor-stator homogenizer.

6 Claims, 5 Drawing Sheets

(58) Field of Classification Search
USPC .................................................. 241/46.01
See application file for complete search history.

(56) References Cited

U.S. PATENT DOCUMENTS

| | | | | |
|---|---|---|---|---|
| 1,928,052 A * | 9/1933 | Fraser | ...................... | B02C 2/10 |
| | | | | 241/261.1 |
| 2,409,453 A * | 10/1946 | Stuck | ...................... | B02C 2/10 |
| | | | | 241/261.1 |
| 2,695,756 A * | 11/1954 | Becker | ................... | B02C 13/22 |
| | | | | 241/261.1 |
| 2,785,155 A | 3/1957 | Anson et al. | | |
| 2,921,749 A * | 1/1960 | Brink, Jr. | .............. | B02C 18/141 |
| | | | | 241/293 |
| 3,305,183 A * | 2/1967 | Morden | ................... | D21D 1/24 |
| | | | | 241/293 |
| 3,689,287 A | 9/1972 | Mitchell, Jr. | | |
| 4,060,203 A | 11/1977 | Edwards et al. | | |
| 4,081,146 A * | 3/1978 | Yagi | .......................... | B02C 7/11 |
| | | | | 241/257.1 |
| 5,039,022 A * | 8/1991 | Nilsson | ................. | D21D 1/306 |
| | | | | 241/261.3 |
| 6,244,528 B1 * | 6/2001 | Wallis | ...................... | B02C 9/00 |
| | | | | 241/23 |
| 6,305,626 B1 * | 10/2001 | Korstvedt | ............... | B02C 7/175 |
| | | | | 241/261.1 |
| 6,450,429 B1 * | 9/2002 | Kirjavainen | .............. | B02C 2/10 |
| | | | | 241/293 |

FOREIGN PATENT DOCUMENTS

| | | |
|---|---|---|
| DE | 2504249 A1 | 8/1976 |
| DE | 102007015219 A1 | 10/2007 |
| EP | 0474102 B1 * | 11/1995 ............. B01F 27/70 |
| EP | 2052623 A1 | 4/2009 |
| EP | 2749180 A1 | 7/2014 |
| EP | 2988619 B1 | 6/2016 |
| GB | 1421623 A | 1/1976 |
| WO | 2003/101573 A2 | 12/2003 |

OTHER PUBLICATIONS

International Search Report and Written Opinion, dated Jun. 5, 2020, for PCT/EP2019/053553, pp. 22.

* cited by examiner

| Grinding process | Sample No. | Description | Starch content total (Mg/m) | Starch content bound (mg/g) | Ratio bound/free (%) | Particle size distribution d-10 (µm) | Particle size distribution d-50 (µm) | Particle size distribution d-90 (µm) |
|---|---|---|---|---|---|---|---|---|
| Dry grinding | 18009-4 | pea flour (>85% / < 400 µm) (dry ground) | 451 | 65 | 14.4 | 19 | 127 | 1247 |
| Dry grinding | 18009-5.2 | pea flour (>85% / < 200 µm) (dry ground) | 492 | 22 | 4.6 | 12 | 40 | 229 |
| Wet grinding | V4 – AL | pea (whole) – 1. step wet grinding (chamber tool / gap: 2.3 mm) | 118 | 30 | 25.1 | 20 | 375 | 1278 |
| Wet grinding | V5 – AL | pea (whole) – 2. step wet grinding (chamber tool / gap: 0.6 mm) | 123 | 10 | 8.1 | 17 | 315 | 728 |
| Hybrid grinding | V8 – AL | pea flour (1.100 µm) chamber tool / gap: 0.2 mm | 127 | 14 | 11.3 | 14 | 153 | 694 |
| Hybrid grinding | V9 – AL | pea flour (>85% / < 400 µm) chamber tool / gap: 0.2 mm | 124 | 7 | 5.3 | 19 | 113 | 504 |
| Hybrid grinding | V91 – AL | pea flour (>85% / < 400 µm) chamber tool / gap: 0.4 mm | 131 | 15 | 11.5 | 10 | 103 | 579 |

FIG. 3

METHOD AND APPARATUS FOR PROCESSING LEGUMES

CROSS REFERENCE TO RELATED APPLICATIONS

Pursuant to 35 U.S.C. § 371, this application is the United States National Stage Application of International Patent Application No. PCT/EP2019/053553, filed Feb. 13, 2019, the contents of which are incorporated by reference as if set forth in their entirety herein, which claims priority to German (DE) Patent Application No. 10 2018 202 275.5, filed Feb. 14, 2018, the contents of which are incorporated by reference as if set forth in their entirety herein.

FIELD OF THE INVENTION

The techniques described herein relate to a process and a device for breaking down legumes and, in particular, peas. The techniques described herein furthermore relate to a process for purifying proteins of an acidic proteinaceous suspension, which is obtained by breaking down legumes.

BACKGROUND OF THE INVENTION

Protein isolates of plant origin represent a valuable alternative or supplementation for animal proteins in food or animal feed. For example, plant proteins in food can effectively replace the animal proteins, and this often at lower costs. Many products, which traditionally contain animal proteins, in particular milk products, can furthermore be a main cause for food allergies.

Most legumes are characterized in that they form a symbiotic relationship with nitrogen-fixing bacteria (*rhizobia*) in their root tubercles. The legumes thus become independent of the nitrate content of the soil and are only viable in extremely low-nitrogen soils. The root tubercles are also responsible that legumes are highly nutrient-rich plants, which contain plenty of proteins, vitamins, and minerals. Legumes thus belong to the best sources for plant protein. Due to the fact that legumes, such as peas (*Pisum sativum*), are easily available and also have a high protein content, including a particularly balanced amino acid composition, they represent a protein source, which represents a valuable alternative for animal proteins. Remarkably, in addition to the proteins, legumes also contain starch and also antinutritive factors (ANF), such as lectins, alkaloids, saponin, cyan glycosides, isoflavones, or tanning agents, which are unwanted.

The significant challenges in the provision of plant proteins lie in the protein composition and protein purity, and comprise aspects, which refer, for example, to extraction, fractioning, pre- and post-treatments. Remarkably, the individual process steps have a large impact on the quality of the isolated plant protein. Remarkably, the type and quantity of the contaminations determine their final value in protein isolates or extracts. Contaminations of this type comprise, for example, carbohydrates. For example, legumes contain a significant portion of flatulence-inducing oligosaccharides (e.g. raffinose, stachyose, and verbascose), which are particularly unwanted. While carbohydrates are generally unwanted contaminations in the final protein isolate, some other "contaminations", such as vitamins or minerals, are, by definition, not unwanted or can even be advantageous for nutritional and/or physicochemical aspects of the protein isolate. In addition to the effect on the final composition of the protein isolates or extracts, the breaking down and/or protein isolation process can have dramatic impacts on the physicochemical or functional properties of the protein isolate. In particular the protein solubility, the viscosity, the emulsification ability, the color, the taste, or the smell are strongly influenced by the used techniques.

The collection of a protein isolate of high quality comprising specific desired properties is thus highly complex and typically includes multiple cost-intensive and time-consuming process steps.

In particular two different processes for separating the individual fractions of legumes and, in particular, peas have established themselves in the prior art. In the case of both processes, a dry grinding of the pea is used as the first process step.

In the first process, a dry, very fine grinding of the pea takes place, followed by a dry separation or enrichment, respectively, of the fractions by means of air separation.

In the second process, a dry pre-grinding of the pea is carried out, and the resulting pea flour is subsequently mashed by adding an aqueous solution. A subsequent wet secondary comminution can optionally also take place here on a grater, before the wet separation of the fractions then takes place by means of protein, fiber, and starch collection process.

In the case of the first process, small to very small particles, which can only be separated insufficiently in the following process, are created by means of the intensive dry grinding. The components (starch, fibers, protein) collected in this way cannot be separated from one another with sufficient accuracy.

In the case of the second process, small to very small particles are likewise created by means of the dry grinding. The portion of bound starch in the fiber is still relatively high (12-15%) in spite of washing out with water. A large portion of the material is smaller than the smallest perforations of the sieves of the fiber separation. An increased fine fiber portion, which is unwanted, is thereby created in the process.

There is thus the need for breaking down processes and protein isolation processes of legumes, which are improved with regard to the above-mentioned disadvantages.

SUMMARY OF THE INVENTION

It is an object of the present invention to provide an improved process for the protein-isolating breakdown of legumes.

According to a first aspect of the invention, a process for breaking down legumes is provided, which comprises the following steps:
  (a) mixing legumes with an aqueous extraction agent;
  (b) pre-comminuting the mixture from step (a) by means of a cutting tool and a grinding tool by adding an aqueous extraction agent between cutting and grinding tool;
  (c) incubating the legumes pre-comminuted by step (b) by further adding the extraction agent, preferably for a duration of at least 20 min;
  (d) fine grinding the pre-comminuted legumes incubated according to step (c) by means of a grinding and mixing tool.

As the inventors have determined, the starch is released virtually completely from the cell composite by means of the multi-stage wet grinding according to the invention, without the fibers being comminuted too much, or the starch grains being damaged. This results in a smaller portion of bound starch at the fiber.

By the use of the above-mentioned tools and the intensive substance exchange, the starch grains are moreover gently released from the fibers, and all particles are homogeneously wetted with the extraction agent.

Compared to the dry grinding, significantly larger particles result with comparable starch yield, which results in a simpler purification.

The process moreover also leads to a smaller thermal stress of the material, which is of significant relevance in view of the easy denaturization of the proteins, which are at hand.

By adding the extraction agent between cutting and grinding tool (preferably by means of the so-called stator injection), a local overdosage of the extraction agent is avoided.

The process furthermore has the advantage that it can be operated by means of the tools and in particular hybrid tools known from the prior art.

The process with its process steps can moreover be integrated into a process line without any problems, and is thus suitable in particular for large-scale use.

BRIEF DESCRIPTION OF THE DRAWINGS

These and other aspects of the invention will be shown as follows in detail in the figures:

FIG. 3 shows the result table of the comparative grinding tests;

DETAILED DESCRIPTION OF SPECIFIC EMBODIMENTS

Figure 1:
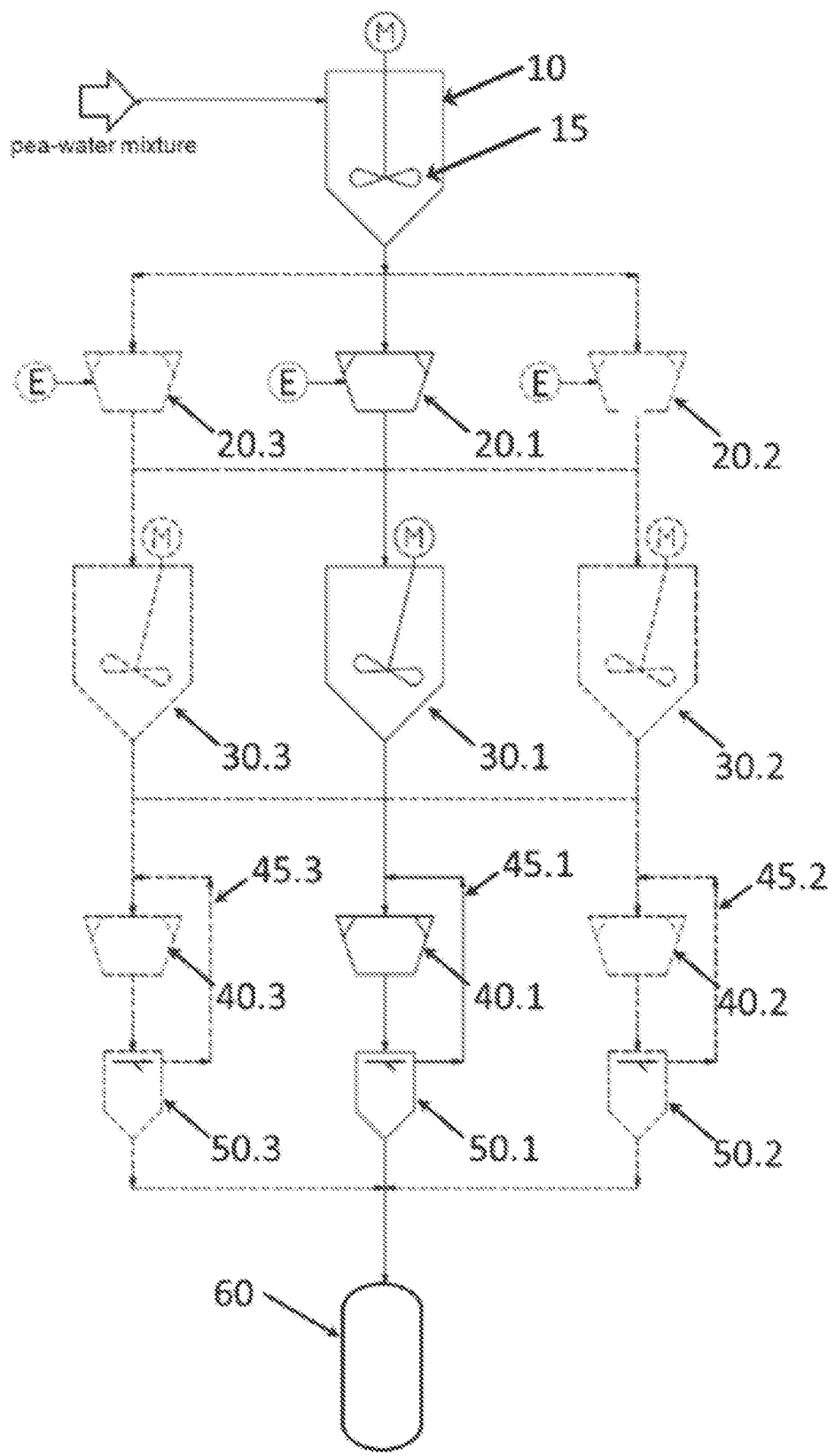
FIG. 1 shows a schematic sketch for an embodiment of the breakdown process according to embodiments described herein.

The starting material for use in the process according to the invention are legumes, thus the seeds of plants of the families Fabaceae or Leguminosae (previously: Papilionaceae), which are also referred to as legumes. In a preferred embodiment, the legumes are thereby selected from the group consisting of *Cajanus cajan* (pigeon pea), *Cicer arietum* (chick pea, field pea), *Lens culinaris* (kitchen lentil), *phaseolus vulgaris* (French bean), *Pisum sativum* (garden pea), *Vicia faba* (field bean, also referred to as thick bean, tic bean, fava bean, tick bean, large bean, horse bean, bell bean, broad bean or faba bean), *Vigna mungo* (urd bean, also referred to as black lentil), *Vigna radiata* (mung bean, also referred to as moong bean, golden gram or green gram), *Vigna unguiculata* (field pea, also referred to as cowpea, black-eyed pea, or field pea), *Lupinus* (lupines), *Glycine max.* (soybean), and combinations thereof. In a preferred embodiment, the process is used to break down seeds of the *Pisum sativum* plant or of the *Cajanus cajan* plant (pigeon pea).

In an embodiment of the invention, the (air) dried seeds are used for the breakdown, this represents the common form of storage for legumes. In an alternative embodiment, fresh or partially dried seeds can also be used. Due to the fact that the process is a wet grinding, this represents a significant advantage as compared to the conventional dry grinding processes.

In a preferred embodiment, whole legumes, i.e. not pre-comminuted, are used in the case of the breakdown process. In the alternative, legumes, which have already been coarsely comminuted, can also be used. The legumes used in step (a) for mixing with the extraction agent can accordingly represent whole legumes or coarsely comminuted legumes.

According to the invention, a cutting tool and a grinding tool is used in response to the pre-comminution, or a tool, respectively, which has a cutting step as well as a grinding step. In the case of the process for breaking down legumes, the tool for the pre-comminution is preferably a rotor-stator homogenizer.

In a preferred embodiment, the tool is a conical pocket tool and/or a chamber tool. The use of a hybrid tool of conical pocket tool and chamber tool is in particular preferred thereby, so that a hybrid tool comprising a cutting and a grinding step is present.

In a preferred embodiment, the pre-comminution step leads to particles comprising an average particle size d50 of between 250 and 400 μm, d50 hereby means that 50% of the particles are smaller than the specified value. The desired particle size can be set in response to the pre-comminution as well as in response to the fine grinding by selecting the tool, the tool configuration, such as, for example, radial and/or axial gap size, and the speed.

When pre-comminuting the legumes, the aqueous extraction agent is preferably added via stator injection in the case of the rotor-stator homogenizer. When using the hybrid tool according to the invention, an addition of the extraction agent thus takes place between the cutting zone and the grinding zone.

According to the invention, aqueous extraction agent is added again to the pre-comminuted legumes after the pre-comminution step, and is preferably incubated for at least 20 minutes after mixing with the legumes. The incubation particularly preferably takes place for a time period of between 30 and 120 minutes. As part of this incubation, the pre-comminuted legumes, which have a larger surface, absorb significant quantities of extraction agent and, as swollen legumes, thus form an optimal starting material for the subsequent wet grinding step. This incubation is preferably carried out in a separate container, the so-called swelling tank. As separate container, this container is separated from the container in which the pre-communication is carried out. This incubation advantageously takes place at room temperature.

An alkaline solution and particularly preferably a 50% caustic soda solution is preferably used as aqueous extraction agent. The ratio (v/m) of the total quantity of aqueous extraction agent to the legumes lies between 500:1 and 300:1, and preferably at 400:1. In a further embodiment, water is initially added to the legumes (preferably peas), and is then set to the desired pH value by adding caustic soda solution. In a preferred embodiment, so much extraction agent is added that the portion of dry substance (TS) in the mixture of peas and extraction agent is less than 25% of TS. In a further embodiment, the finely ground mixture for the separation of the fibers and starch particles, which preferably takes place in a decanter, has a content of less than 17% of TS.

In an embodiment, the inflow to the container, in which the fine grinding is carried out, from the upstream swelling tank takes place solely via the height difference of the swelling tank, which is positioned higher, without active pumping. In an embodiment, aqueous extraction agent is added in the fine grinding step. This preferably takes place via a stator injection directly into the mixing zone of the homogenizer.

According to the invention, a grinding tool together with a mixing tool is used in the case of the fine grinding, or a tool, respectively, which has a grinding stage as well as a mixing stage. In the case of the process for breaking down legumes, the tool for the fine grinding is preferably a rotor-stator homogenizer. The rotor-stator homogenizer is thereby preferably a chamber tool and/or a nozzle tool, and particularly preferably a chamber tool. In a preferred embodiment, the fine grinding step leads to particles comprising an average particle size d50 of between 100 and 300 μm, d50 thereby means that 50% of the particles are smaller than the specified value.

In the case of the process according to the invention, the rotor-stator homogenizer preferably has a relative speed at the outer ring of between 30 m/sec and 60 m/sec. It turned out that such relative speeds allow for a particularly good comminution or fine grinding, respectively, without the legumes being heated too strongly. In an embodiment of the invention, the radial shearing gap between rotor and stator in the case of the rotor-stator homogenizer is between 0.5 mm and 2.5 mm, preferably between 0.7 mm and 1.8 mm, and particularly preferably between 1.0 mm and 1.2 mm.

In a further embodiment of the process according to the invention, the axial shearing gap at the innermost ring is maximally 5 mm. The axial shearing gap advantageously decreases from the inside to the outside, so that it is ≥0.2 mm at the outermost ring.

According to a preferred embodiment of the invention, the aqueous extraction agent is placed into the centrally located stator, and is thereby supplied through stator openings directly into the shearing and mixing zone of the homogenizer, particularly preferably.

In a preferred embodiment, coarser particles are separated in the fine grinding step, for example by means of a centrifugal force separator, and are supplied into the homogenizer again and there preferably into the grinding zone.

In a further embodiment, the breakdown process comprises the following process steps, downstream from the wet grinding:
(i) a two-stage separation of the proteinaceous solution (so-called fruit water) and of the starch/fiber fraction;
(ii) precipitation of the protein from the proteinaceous solution by adapting the pH value by setting the isoelectric point,
(iii) separation of the precipitated protein, preferably by means of decanter centrifuge.

It is a further object of the present invention to provide an improved device for breaking down legumes.

According to a second aspect of the invention, a device for breaking down legumes is provided.

This device for breaking down legumes comprises a process line comprising a first section (I) comprising one or several rotor-stator homogenizers for the pre-comminution of the legumes, and a second section (II) comprising one or several rotor-stator homogenizers for the fine grinding of the legumes.

The pre-comminuted legumes can be guided from the section (I) directly into the section (II) or via a container arranged therebetween. The incubation of the legumes pre-comminuted in section (I) can preferably take place in such a container by means of the added extraction agent. This has the advantage that the section (I) can be loaded with legumes again, which are then pre-comminuted in section (I) during the incubation of the previous batch in the intermediate container.

In this embodiment, the device comprises a container attached between section (I) and (II), the so-called swelling tank, which is connected to both sections in a liquid-guiding manner.

The device advantageously has one or several pumping and/or circulating devices, which ensure the transport of the legumes, of the intermediate products, and/or of the extraction agent.

In a preferred embodiment, the device has one or several temperature sensors for measuring the temperature in the sections (I) and (II), and optional further containers. The temperature can thereby be monitored continuously and can optionally be controlled by adapting the process parameters, such as, for example, by a reduction of the counter pressure.

In a further embodiment, the device moreover comprises a cooling device, which is in particular geared towards cooling section (II), because the temperature will increase in particular in this section due to the high shearing forces, associated with the recirculation of a partial particle flow.

In a third aspect, the invention relates to the use of the device according to the invention for carrying out the process according to the invention for breaking down legumes.

In a fourth aspect, the invention relates to a process for purifying a proteinaceous acidic suspension, wherein the purification process comprises the following steps:
(e) production of a homogenous suspension by intensive mixing of the proteinaceous acidic suspension by means of a rotor-stator homogenizer;
(f) pH value increase of the suspension by means of a rotor-stator homogenizer by adding an alkaline solution via stator injection during the ongoing rotor operation up to a pH value of between 5.5 and 9.0;
(g) separating the protein from the liquid phase by means of centrifugation or filtration.

In a fifth aspect, the invention relates to a process for purifying proteins from a proteinaceous acidic suspension, which was collected by breaking down legumes, wherein the insulation process comprises the following steps:
(e) production of a homogenous suspension by intensive mixing of the proteinaceous acidic suspension by means of a rotor-stator homogenizer;
(f) pH value increase of the protein suspension by means of a rotor-stator homogenizer by adding an alkaline solution via stator injection during the ongoing rotor operation up to a pH value of between 5.5 and 9.0;
(g) separating the protein from the liquid phase by means of centrifugation or filtration.

This process has several advantages as compared to the prior art. First of all, it can be designed as closed system, so that no contamination takes place from the outside (for example by human contact). Furthermore, there is only a small thermal stress of the material. Finally, the stator injection allows for a pH value increase of the protein without isolated overdosage.

The moderate pH value increase to maximally pH 9.0 and preferably to maximally pH 8.5 has the result that the protein, which is present as a solid, is still present as a solid, whereby numerous contaminations, such as salts, dissolve and can thus be separated from the protein. This thus represents a simple purification process for protein suspensions.

The proteinaceous suspension, which is to be used in this purification process, is preferably produced by means of the breakdown process according to the invention for legumes or by using the device according to the invention.

In a furthermore preferred embodiment, the purification process follows the above-disclosed breakdown process comprising the steps (a) to (d) as well as the downstream process steps (i) to (iii). The proteinaceous acidic suspension is thereby obtained by suspending the precipitated protein obtained in step (iii) in water, preferably in pure water or demineralized water, and preferably has a pH value of 4.0 to 5.5.

The same rotor-stator homogenizer in steps (e) and (f) is preferably used for the step of the production of the homogenous suspension and the step of the pH value increase of the suspension.

The material preferably enters axially into the rotor-stator homogenizer and is radially discharged again. According to the used tool, shearing, compression, and decompression forces thereby act on the material when passing through the tool. Due to the multi-stage shearing, the high-frequency oscillating forces as well as the intensive substance exchange, all particles are wetted individually and absolutely homogenously with the alkaline solution.

In a preferred embodiment, one or several rotor-stator homogenizers, which has/have multi-stage, coaxially engaging tools, is used in the case of the purification process. In a preferred embodiment of the purification process, the rotor-stator homogenizer used thereby is a chamber tool or a hybrid tool of chamber tool and nozzle tool. In a further preferred embodiment, the rotor-stator homogenizer used in the case of the purification process is a chamber tool, which preferably has one or several of the following properties:

- the radial shearing gap between rotor and stator is between 0.5 mm and 5 mm;
- the axial shearing gap between rotor and stator at the innermost ring is maximally 5 mm;
- the axial shearing gap between rotor and stator decreases from the inside to the outside;
- the axial shearing gap between rotor and stator at the outermost ring is between 0.2 mm and 1 mm;
- the chamber tool has 2 to 5 concentrically aligned toothed rings, which are preferably formed for the combined axial and radial gap adjustment.

In an embodiment of the invention, the rotor-stator homogenizer has a relative speed at the outer ring of between 20 m/sec and 60 m/sec in the case of the protein insulation process.

In a preferred embodiment, the alkaline solution is placed into the centrally located stator in the case of the protein purification process, and is preferably supplied through stator openings directly into the mixing zone of the homogenizer. According to the invention, the alkaline solution is an aqueous solution. This solution preferably has a pH value of at least 12, particularly preferably of at least 13, and in particular preferably of larger than or equal to 14. In an embodiment, the alkaline solution is an NaOH solution comprising between 10 and 40% of NaOH, preferably comprising between 15 and 30% of NaOH, and in particular comprising 20% of NaOH. The pH value increase according to the invention preferably leads to a suspension comprising a pH value of between 6.5 and 9.0, and particularly preferably to a pH value of between 7.0 and 8.5.

In an embodiment of the invention, the separation of the proteinaceous solid phase from the liquid phase, which contains the contaminations, takes place by means of centrifugation or decanting. In a further embodiment, the separated solid state protein is supplied to the drying process.

In a further aspect, the invention provides a device for isolating proteins from an acidic proteinaceous suspension, whereby this device comprises a process line comprising a section (III) comprising one or several rotor-stator homogenizers according to the invention, and a second section (IV) for separating the protein, which occurs as a solid. In a further embodiment, the device for isolating the proteins comprises the sections (I) and (II) for breaking down the legumes as well as the sections (III) and (IV) for the pH value increase and separation of the protein, which occurs as a solid.

Definitions

A "rotor-stator homogenizer" according to the invention is a homogenizer comprising a stator as stationary, immobile apparatus part, and a rotor as rotating apparatus part of the homogenizer. Due to the relative movement between rotor and stator in combination with sufficiently small axial and radial gap widths, the product is comminuted and/or dispersed in a controlled manner and escapes laterally from the system. Preferably, this is a coaxial homogenizer, that is, stator as well as rotor have the same central axis, which thus represents the axis of rotation.

A homogenizer of this type allows for an efficient distribution of a disperse phase into a surrounding continuous phase. In particular in the case of the breakdown process according to the invention, when for example legumes and extraction agent cannot be mixed or can only be mixed poorly, the forces, which counteract an even distribution, are overcome by means of the energy input.

The mode of action of rotor-stator systems is based on the micro-turbulence created by means of shear stresses. It forms a region of high energy dissipation in the area of dispersion tools. The highly concentrated form of the energy input is thus the basis for overcoming the stabilizing effect of the boundary surface tension, which exists in substance mixtures. The phase boundary surfaces are thus increased and the desired product properties are thus attained in dispersion.

A "conical pocket tool" according to the invention is a rotor-stator homogenizer, in the case of which the rotor has a circular cone or truncated cone as central element, which has elongated, radially running depressions, the so-called "pockets". As counter piece, the stator is provided with a corresponding conical or truncated cone-shaped depression formed in a complementary manner, respectively, and likewise has elongated, radially running depressions.

A "nozzle tool" according to the invention is a rotor-stator homogenizer, in the case of which at least the stator and preferably stator and rotor has circular aperture plates comprising a defined hole diameter.

A "chamber tool" according to the invention has several concentrically running rings comprising radial openings, wherein the rings on the rotor and stator side alternately engage coaxially with one another and thus develop a shearing effect.

The tools used in the case of the process according to the invention are defined as follows according to their functionality: A "cutting tool" is a tool, which has a cutting and shearing function. A "grinding tool" is a tool, which has a shearing and squeezing function, and a "mixing tool" is a tool, which has a hydrodynamic shearing function.

Exemplary Embodiments

1. Comparison of Different Breakdown Techniques

The following three variations of the breakdown processes, based on peas, were performed comparatively in a test series:

1.1 One-stage Dry Grinding

Two products with different grinding degree were produced on a mill comprising turbo rotor, and the particle size distribution and the starch content (total starch and bound starch) were determined.

1.2 Two-stage Wet Grinding

Two passages were made with different tool configurations by means of the wet mill. In the first passage, a whole pea was pre-comminuted, the pea mush from the first passage was then further comminuted in the second passage.

1.3 Hybrid Grinding (1. Stage Dry Grinding/2. Stage Wet Grinding)

In the case of this test approach, two different fine, dry ground pea flours were mixed into water and were allowed to swell. The resulting pea mush was subsequently reground by means of the wet mill.

2. Results

The results are reflected in the table in FIG. 3. The two-stage wet grinding leads to a significant improvement of the ratio of particle size d50 to bound starch of 8.82 and 8.7 [μm/%] to 38.9 [μm/%] as compared to the dry grinding.

With 8.1% with a particle size of d50=315 μm, the ratio of bound to free starch thereby lies at an acceptable ratio.

Remarkably, the portion of bound starch in the case of a breakdown is to be as small as possible, and at the same time with particles, which are as large as possible. This has significant advantages in response to the separation of starch and fibers. In addition, the fine fiber portion is reduced thereby.

The two-stage wet grinding thus leads to a significantly better separation of the pea components.

FIG. 1 shows a schematic sketch of a process line for the breakdown of legumes for optimally collecting proteins contained therein. In the mashing tank 10 equipped with a stirrer 15, the mixture of water and peas is brought to an alkaline pH value by adding a caustic soda solution, and is incubated for a short time (preferably 10 min to 30 min). The mixture is then added into a container comprising a rotor-stator homogenizer 20.1, and is pre-comminuted there by adding additional extraction agent E. The comminuted peas are subsequently allowed to swell under mixing in a swelling tank comprising a stirrer 30.1, preferably for a duration of at least 20 min, before they are then finely ground in a second container 40.1, which is equipped with a rotor-stator homogenizer. Coarse particles are supplied to the grinding process again via a return line 45.1. The obtained, finely ground suspension is then supplied to a device for the particle separation 50.1, before it is then separated in the separating stage 60.

The option of increasing the throughput by establishing parallel process lines is also shown.

Figure 2:
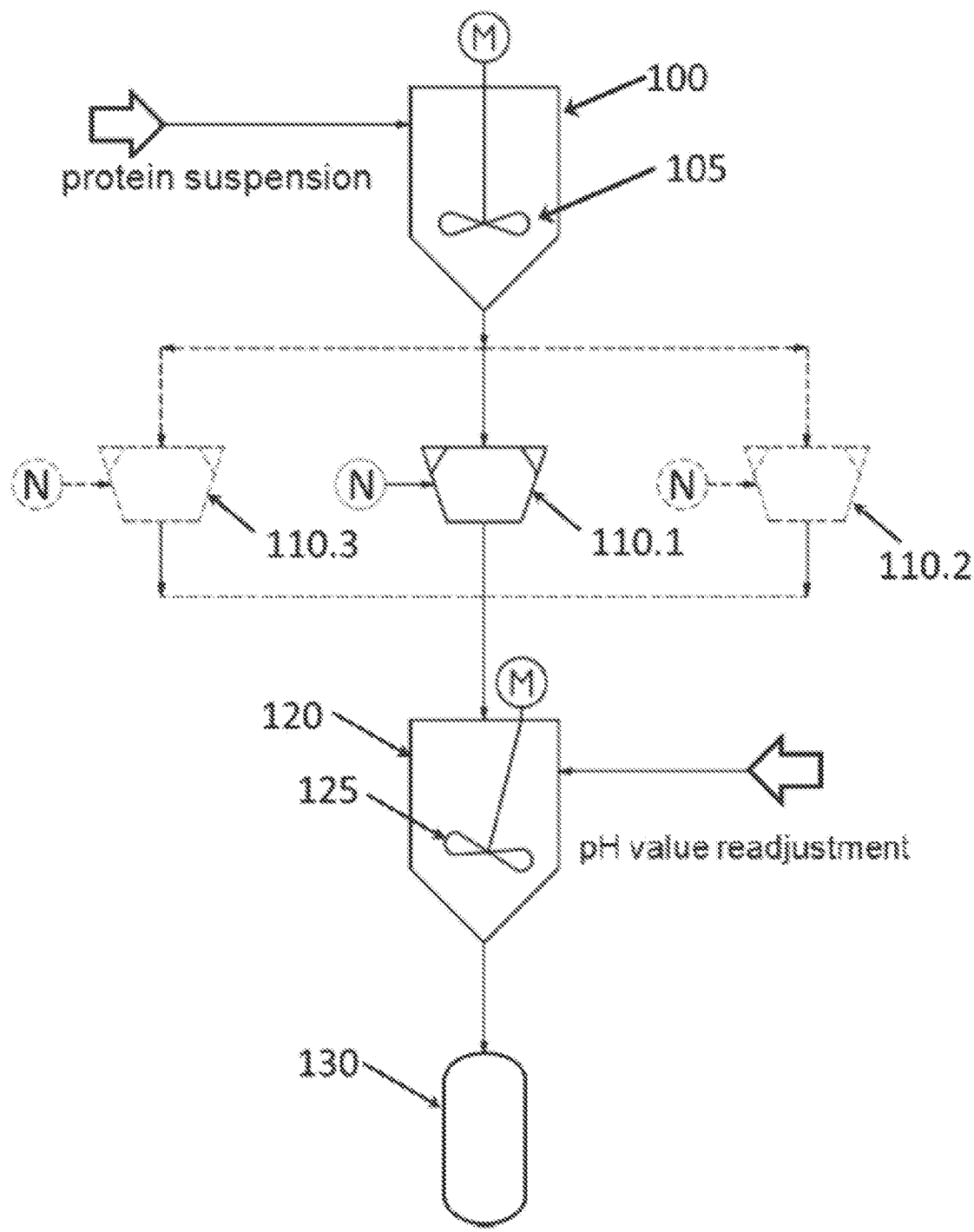
FIG. 2 shows a schematic sketch for an embodiment of the purification process according to embodiments described herein.

FIG. 2 shows a schematic sketch of a process line for the purification of proteins, which are present as solids in an acidic suspension. The acidic proteinaceous suspension is supplied in the mixing tank 100, which is equipped with a stirrer 105. From there, it is then pumped into a container comprising a rotor-stator homogenizer 110.1, and a homogenous suspension is created there by means of intensive mixing. By adding the alkaline solution N via rotor-stator injection during the ongoing rotor operation, the pH value is raised to a target value of between 5.5 and 9.0, so that contaminations, such as salts, dissolve, but the protein still remains in the suspension as a solid. By adding acid or caustic solution, the pH value is readjusted in the downstream container 120, which has a stirrer 125, before the separation of the solid state protein from the liquid phase takes place, which now contains the contaminations in separating step 130. The possibility of increasing the throughput by establishing parallel process lines (here X.2 and X.3) is also shown.

FIG. 3 is an overview in table form with regard to the results of exemplary embodiment 1.

Further variations of the invention and the performance thereof result for the person of skill in the art from the preceding disclosure, the figures, and the patent claims.

Terms such as "comprise", "have", "include", "contain", and the like used in the patent claims do not exclude further elements or steps. The use of the indefinite article does not exclude a plurality. An individual mechanism can carry out the functions of several units or mechanisms, respectively, mentioned in the patent claims. Reference numerals specified in the patent claims are not to be considered as limitations of the used means and steps.

Figure 4:
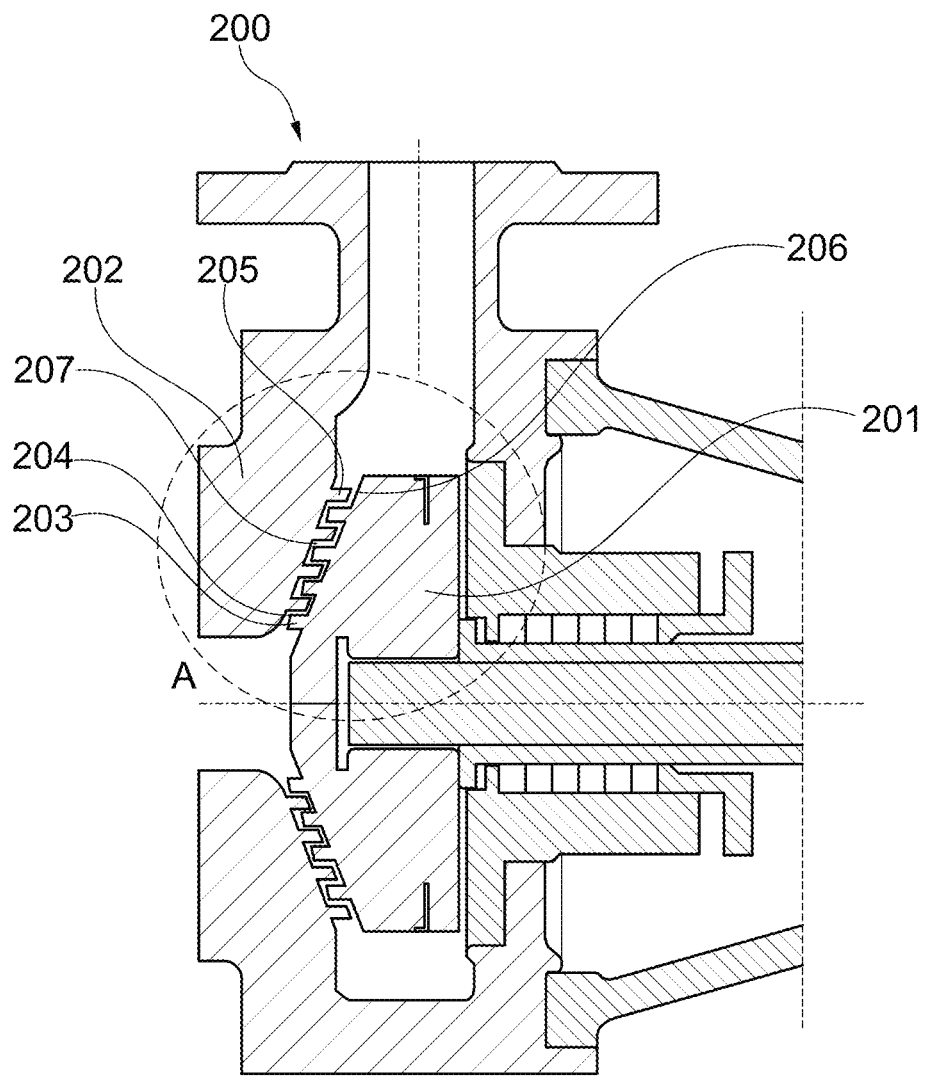
FIG. 4 shows a diagram of a chamber tool having a rotor-stator homogenizer as described herein.

FIG. 4 shows a diagram of a chamber tool 200 having a rotor-stator homogenizer as described herein. A first rotor-stator homogenizer 20.1 and a second rotor-stator harmonizer 40.1 are shown in FIG. 1. The chamber tool 200 includes an outer ring 205. The chamber tool 200 includes a rotor 201 and a stator 202. The chamber tool 200 further includes an innermost ring 203.

Figure 5A:
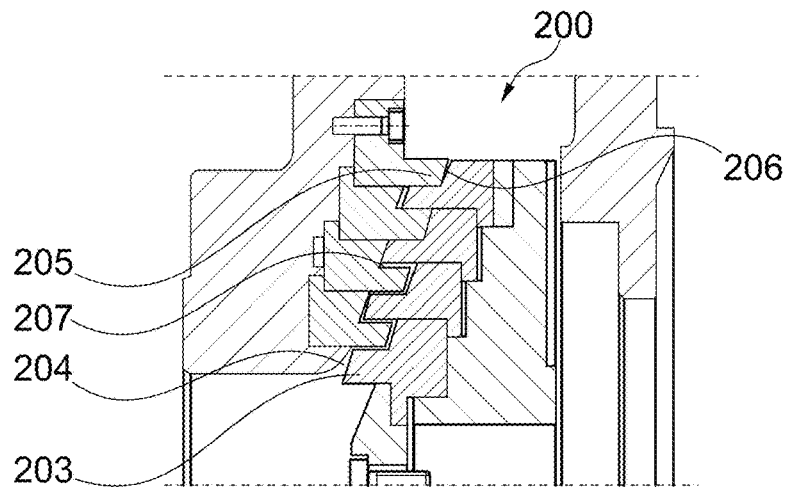
FIG. 5A shows a diagram of a chamber tool as shown in circle A of FIG. 4, as described herein.

FIG. 5A shows a diagram of a chamber tool 200 shown in circle A of FIG. 4, as described herein.

Figure 5B:
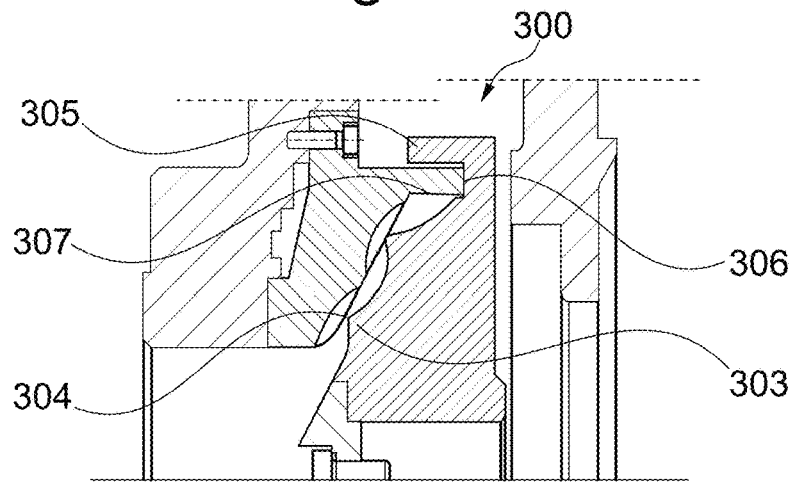
FIG. 5B shows a diagram of a conical pocket tool as described herein.

FIG. 5B shows a diagram of a conical pocket tool 300 as described herein.

Figure 5C:
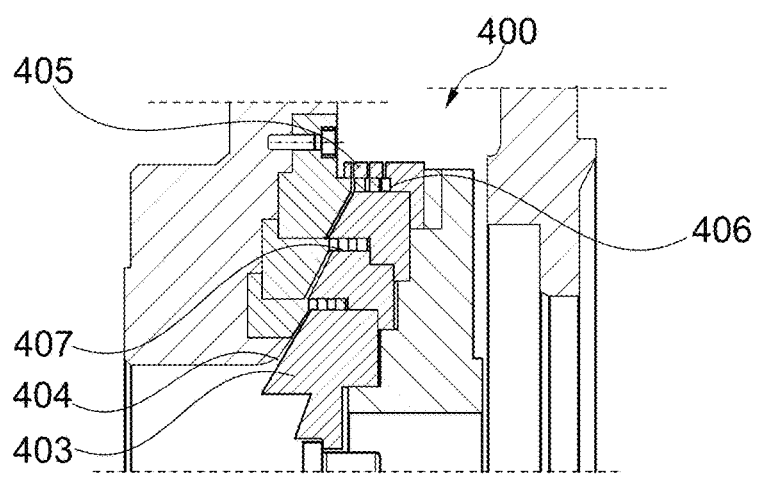
FIG. 5C shows a diagram of a nozzle tool as described herein.

FIG. 5C shows a diagram of a nozzle tool 400 as described herein.

The invention claimed is:

1. A method for breaking down legumes, comprising:
   mixing legumes with an aqueous extraction agent to form a legume mixture;
   pre-comminuting the legume mixture using a conical pocket tool or a chamber tool as a first rotor-stator homogenizer and adding an aqueous extraction agent through stator openings directly into a shearing and mixing zone of the conical pocket tool or the chamber tool;
   incubating the pre-comminuted legume mixture by adding the aqueous extraction agent using a swelling tank arranged between the conical pocket tool or the chamber tool as the first rotor-stator homogenizer and the chamber tool or a nozzle tool provided as a second rotor-stator homogenizer in a liquid-guiding manner; and
   fine grinding the incubated legume mixture using the chamber tool or the nozzle tool provided as the second rotor-stator homogenizer.

2. The method of claim 1, comprising selecting the legumes from a group consisting of *Cajanus cajan*, *Cicer*

*arietum*, Lens culinary, *phaseolus vulgaris, Pisum sativum, Vicia faba, Vigna mungo, Vigna radiata, Vigna unguiculata*, and any combinations thereof.

3. The method of claim 1, comprising incubating the pre-comminuted legume mixture for a duration of at least 20 minutes.

4. The method of claim 1, comprising operating the conical pocket tool, the chamber tool(s), or the nozzle tool with a relative speed of between 30 meters per second (m/sec) and 60 m/sec at an outer ring.

5. The method of claim 1, comprising providing the conical pocket tool, the chamber tool(s), or the nozzle tool with a radial shearing gap of between 0.5 millimeters (mm) and 2.5 mm between a rotor and a stator of the conical pocket tool, the chamber tool(s), and/or the nozzle tool.

6. The method of claim 1, comprising providing the conical pocket tool, the chamber tool(s), or the nozzle tool with a maximum axial shearing gap of 5 millimeters (mm) between a rotor and a stator at an innermost ring, wherein the axial shearing gap decreases from an inside to an outside and is ≥0.2 mm at an outermost ring.

* * * * *